3,078,323
HYDROISOMERIZATION PROCESS
Robert E. Kline, Verona, William C. Starnes, Cabot, and Robert C. Zabor, Glenshaw, Pa., assignors to Gulf Research & Development Company, Pittsburgh, Pa., a corporation of Delaware
Filed Dec. 31, 1959, Ser. No. 863,362
5 Claims. (Cl. 260—683.65)

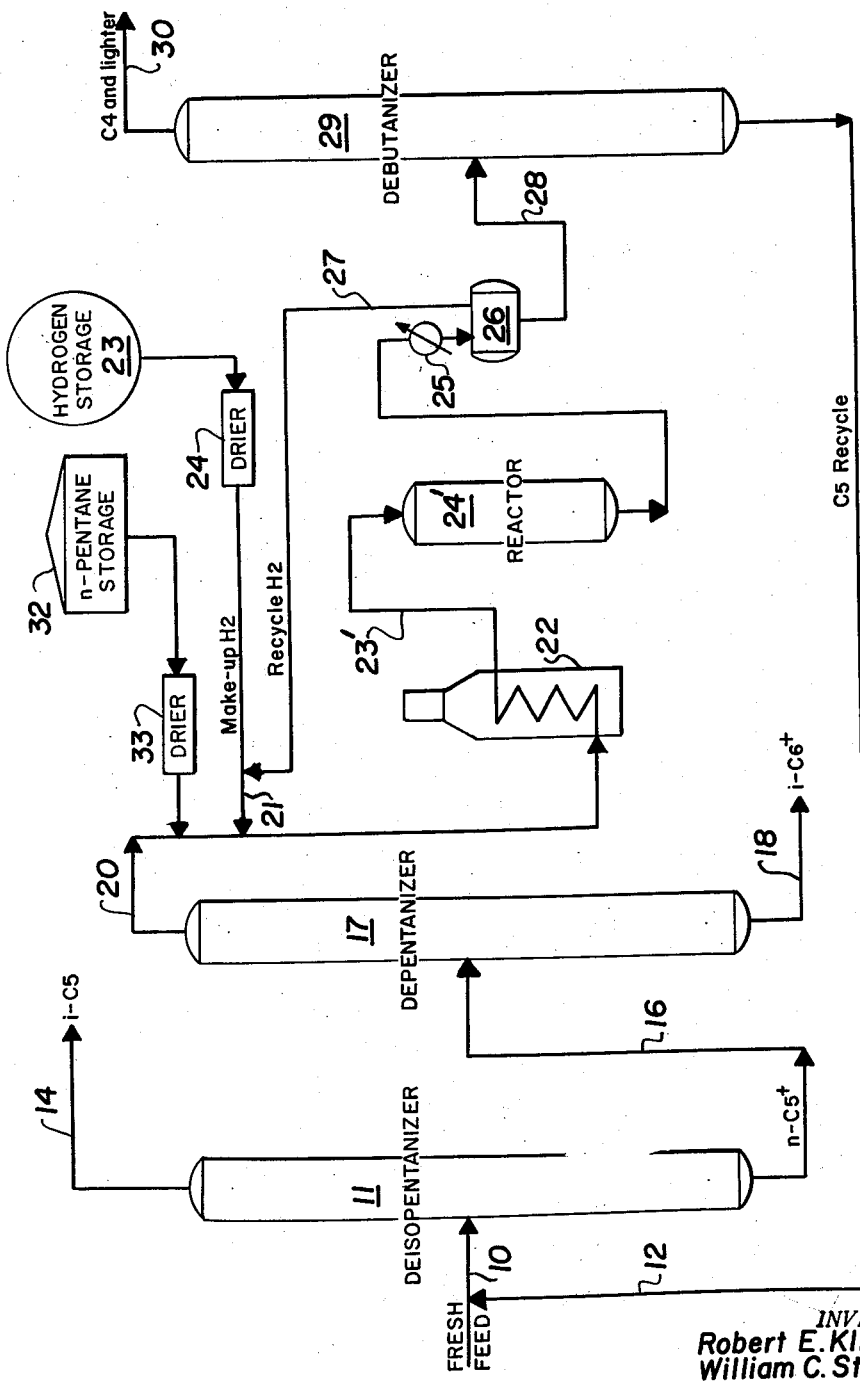

This invention relates to isomerization of aliphatic paraffins and more particularly to an improvement in the isomerization of $C_4$ to $C_7$ aliphatic paraffins in the presence of hydrogen and a platinum-type isomerization catalyst.

The isomerization of aliphatic paraffins is an important procedure in the petroleum and chemical industries. For example, it is important in the petroleum industry for converting straight chain paraffins or singly branched paraffins to their more highly branched isomers of higher octane rating. It is known to isomerize paraffins in the presence of hydrogen and platinum-type catalysts. According to one known procedure the isomerization is carried out under reaction conditions similar to those used in catalytic reforming, including low liquid-hourly space velocities and high hydrogen concentrations. A recently developed process for hydroisomerization of aliphatic paraffins obtains very high space-time-yield of isomer product by the use of a novel combination of conditions including low hydrogen concentration and high space velocity. This process, as applied to the isomerization of n-pentane, has been described in the patent to Starnes et al., U.S. 2,831,908.

Platinum-type catalysts that have been proposed for paraffin hydroisomerization processes include those that have been employed in catalytic reforming. Reforming catalysts of this type have been described in a number of patents, including U.S. Patents 2,478,916, 2,479,109, 2,550,531 and 2,560,329. These catalysts comprise a minor amount of a platinum group metal deposited on a support such as alumina or silica-alumina, and normally contain a small amount of chlorine which is incorporated when the catalyst is prepared from noble metal halides. The catalyst may also contain added amounts of chlorine or of other halogens, especially fluorine.

Recently, platinum-type catalysts have been developed which are especially adapted for hydroisomerization of paraffins. These catalysts have a higher content of halogen, especially of fluorine, than is customary for platinum-type catalysts used for naphtha reforming wherein a primary object is production of aromatics. They exhibit improved activity and selectivity in the isomerization of aliphatic paraffins.

We have now discovered that improved hydroisomerization of normal paraffins over supported platinum-type catalysts is obtained if at least a portion of the reactor charge, including the hydrocarbons and hydrogen of the charge, is subjected to a drying or water removal treatment before contact with the catalyst, so as to reduce the water content of the reactor charge to less than 35 parts by weight of water per million parts of hydrocarbon and preferably less than 15. We have further discovered that the advantages of predrying at least a portion of the reactor charge are especially significant when the isomerization is carried out at a temperature below about 850° F. with a highly active platinum-type catalyst that has a high content of halogen. Our discovery applies to isomerization either at conditions similar to those that have been used for naphtha reforming or to isomerization under conditions that are especially adapted for paraffin isomerization as disclosed in the Starnes et al. patent, U.S. 2,831,908. However, the greatest advantages of our discovery are obtained when the isomerization is carried out under the conditions of low hydrogen concentration and high space velocity as disclosed in the latter patent, and especially when a catalyst of high halogen content is employed at a temperature below about 850° F.

Our process in general comprises contacting at least a portion of the hydroisomerization reactor charge consisting essentially of a hydrocarbon fraction and a hydrogen-rich gas with a solid adsorbent drying agent and thereby reducing the water content of the reactor charge to less than 35 and preferably less than 15 parts by weight of water per million parts of hydrocarbon in the reactor charge. The substantially dry reactor charge is then contacted with a supported platinum-type hydroisomerization catalyst at isomerization conditions. Preferably, the isomerization catalyst is a platinum-alumina catalyst containing at least 3 weight percent fluorine and the isomerization conditions comprise a temperature from 600° to 850° F., a liquid-hourly space velocity of at least 5 volumes of hydrocarbon per volume of catalyst per hour and a hydrogen concentration less than that corresponding to a mol fraction of hydrocarbon of 0.5.

The advantages of our new procedure of drying the components of the reactor charge to reduce the water content below a certain level apply to a considerable range of isomerization feed stocks, catalysts and reaction conditions. The charge stocks to which our procedure applies include aliphatic paraffins of the $C_4$ to $C_7$ range. The charge stock can be a substantially pure fraction of n-butane, n-pentane, n-hexane, or n-heptane, or it can be a refinery fraction predominating in one of these n-paraffins and containing minor amounts of other hydrocarbons of similar boiling points. It can also be a mixture of two or more of these n-paraffins or of fractions predominating therein. Most suitably, the charge stock is a refinery fraction that consists predominantly of one or more of the n-paraffins plus minor amounts of other hydrocarbons of similar boiling range that would normally be present in light, straight-run petroleum fractions or in natural gasoline fractions or in paraffin fractions recovered from conversion processes such as catalytic reforming.

In the isomerization process for which our drying procedure has its greatest advantages, i.e., isomerization at high space velocity, low hydrogen concentration and temperature below 850° F. over a supported platinum-type catalyst of high halogen content, the charge should be highly paraffinic. It should have a negligible or low content of cyclics. A paraffinic charge particularly suitable for this preferred modification of the process is a refinery n-pentane fraction which contains 85 volume percent or more n-pentane and the rest consisting essentially of other open chain paraffins. Such a fraction can contain minor amounts of isopentane (e.g., 7 percent), branched chain hexanes (e.g., 6 percent), cyclopentane (e.g., 1 percent) and pentenes (e.g., 1 percent). Another example of a charge stock for the preferred modification of the process is a hexane fraction that contains at least 85 volume percent aliphatic hexanes. The methylpentanes can be isomerized to the more valuable highly branched isomers. Therefore, the hexane fraction can contain a large concentration of methylpentanes. A typical example is a straight run hexane fraction that contains 41 volume percent n-hexane, 48 percent methylpentanes, 1 percent dimethylbutanes, 7 percent cycloparaffins, 1.5 percent n-pentane and 1.5 percent benzene. In the preferred modification of the process the reactor feed should have the lowest cyclics content that is economically feasible considering the separation costs. In any event, in this preferred modification at least 90 percent of the hydrocarbon charge should consist of aliphatic paraffins of no more than 7 carbon atoms per molecule.

Our catalyst is composed of a minor amount of a noble metal of the platinum group, i.e., platinum, palladium, rhodium or the like, and a major amount of a support or carrier. The catalyst can be in the form of irregular granules or of particles of uniform size and shape made by pilling, extrusion or other methods. The noble metal content is from 0.1 to 5.0 percent by weight and preferably is from 0.2 to 1.0 percent by weight. Catalytic alumina is a preferred support. The greatest advantages of our invention are obtained with highly active, platinum-type isomerization catalysts that contain a substantial amount of halogen, which serves as an isomerization promoter. The best halogen for this purpose is fluorine. The preferred catalysts composed of platinum on alumina or platinum on silica-alumina contain from 1 to 4 weight percent fluorine. These are highly active for isomerization and can be used at temperatures considerably below 850° F., in which temperature range the process of the invention is especially advantageous.

Although alumina is a preferred support, other known supports for platinum-type reforming and isomerization catalysts can be used. Other suitable supports include silica-stabilized alumina; fresh, aged or deactivated silica-alumina composites; silica-magnesia; bauxite; etc. With any of the catalysts, activating components such as a halogen compound can be added indirectly by including them in the feed stream.

A specific preferred catalyst for our process consists essentially of about 0.5 weight percent platinum, about 0.2 weight percent chlorine, about 3.8 weight percent fluorine and the rest alumina. Another specific preferred catalyst consists essentially of about 0.4 weight percent palladium, about 0.1 weight percent chlorine, about 2.5 weight percent fluorine and the remainder a silica-alumina composite.

Advantages can be obtained with our procedure of drying components of the reactor charge for paraffin isomerization over considerable ranges of reaction conditions. Reaction conditions applicable to our process include a temperature from about 600° to 900° F., a pressure from about 100 to 1000 pounds per square inch gauge, a liquid-hourly space velocity from about 1 to 25 volumes of hydrocarbon per volume of catalyst per hour or higher and hydrogen concentrations ranging from the very low hydrogen concentrations disclosed in U.S. 2,831,908, to the higher hydrogen concentrations used in reforming processes, for example, 5,000 to 20,000 standard cubic feet of hydrogen per barrel of hydrocarbon.

Our novel procedure has its greatest advantages when employed with a highly active, fluorine-promoted, supported platinum-type catalyst at rather low isomerization temperatures, high space velocity and low hydrogen concentration. The highly active, fluorine-promoted, platinum-type catalyst can be employed for isomerizing $C_4$ to $C_7$ paraffins at temperatures below about 850° F. and frequently as low as about 600° F. With such low temperatures we have discovered that it is especially advantageous to contact components of the reactor charge with a drying agent to reduce the water content to below 35 parts per million.

It is also especially advantageous to employ our drying procedure when operating under isomerization conditions conducive to high space-time-yield of isomer and high isomerization efficiency as described in U.S. 2,831,908. We use the term "space-time-yield of isomer" in its usual sense as meaning the volume of isomer produced per hour per volume of catalyst. This is an important characteristic of the process because it indicates the amount of the desired product that can be produced in a reactor of given size in a given period of time. By "high isomerization efficiency" we mean the ratio of isomer yield to total yield of conversion product.

The conditions conducive to high space-time-yield of isomer and high isomerization efficiency include a low hydrogen concentration in the range corresponding to a mol fraction of hydrocarbon in the charge from about 0.5 to 0.9 or 0.95 and a high space velocity of above 5 liquid volumes of hydrocarbon per volume of catalyst per hour and preferably above 8 vol./vol./hr. Space velocities as high as 25 vol./vol./hr. or higher can be employed in combination with the indicated low hydrogen concentration range. The preferred pressure range for this modification of our process is 200 to 600 pounds per square inch gauge. The hydrogen concentration in the preferred modification of our process is less than about 1,000 standard cubic feet of hydrogen per barrel of hydrocarbon for the $C_4$ to $C_7$ aliphatic paraffin charge stocks, in contrast to the hydrogen concentrations of about 5,000 to 20,000 standard cubic feet per barrel of hydrocarbon (corresponding to about 0.15 to 0.04 mol fraction of hydrocarbon) which are commonly used in reforming processes which treat naphthenic fractions mainly to accomplish aromatization and hydrocracking. The hydrogen employed in our process need not be pure hydrogen. A hydrogen stream which we have found produces excellent results consists essentially of about 80 to 90 mol percent hydrogen and 10 to 20 mol percent $C_1$ to $C_4$ hydrocarbons.

Although the concentration of hydrogen in our preferred modification is quite low, that is, less than about 1,000 standard cubic feet per barrel of hydrocarbon, the concentration must still be appreciable. There is a minimum hydrogen concentration below which good results are not obtained and below which the catalyst is rapidly deactivated by carbonaceous deposits. Therefore, we use a hydrogen concentration above that at which rapid catalyst deactivation begins. When isomerizing $C_4$ to $C_7$ paraffins under the described combination of conditions including high space velocity, low hydrogen concentration, moderate temperature and in the presence of a highly active, fluorine-promoted, platinum-type catalyst to obtain high space-time-yield of isomer, our new procedure of drying the components of the reactor charge to reduce the water content below 35, and preferably below 15, parts by weight of water per million parts of hydrocarbon has its greatest advantages.

We will describe our invention in more detail with reference to the drawing of which the sole FIGURE is a schematic flow diagram of one modification of our isomerization process in which the charge stock is n-pentane.

The fresh feed, a predominantly n-pentane fraction, is charged via line 10 to the deisopentanizer column 11 in admixture with pentanes introduced by line 12. The overhead fraction comprises the iso-pentane product which is withdrawn by line 14. The bottoms fraction comprising n-pentane and heavier hydrocarbons is withdrawn by line 16 and charged to depentanizer column 17. A bottoms fraction comprising isohexanes and other hydrocarbons higher boiling than n-pentane is withdrawn by line 18 and a fraction comprising at least about 85 volume percent n-pentane is withdrawn overhead by line 20. The n-pentane fraction is mixed with a hydrogen-rich gas, e.g., comprising 80 mol percent or more hydrogen, introduced by line 21 and the mixture is preheated to reaction temperature, for example, 700° F., by passage through the furnace 22.

The hydrogen introduced to the charge line 20 by line 21 comprises recycle hydrogen and make-up hydrogen which compensates for any consumption of hydrogen in the reaction zone. The make-up hydrogen, which is normally charged from storage such as hydrogen storage tank 23, may have a high content of water. This hydrogen is passed through the drier 24 wherein the water content is reduced to such a low level that the reactor charge of line 23′ consisting of the hydrocarbon fraction from line 20 and the hydrogen-rich gas from line 21, contains less than 35 parts by weight of water per million parts of hydrocarbon in the reactor charge.

The substantially dry reactor charge is introduced by line 23′ to reactor 24′ containing a fixed-bed of pelleted isomerization catalyst composed of platinum on alumina promoted with fluorine, at isomerization conditions. Typical conditions include a temperature of 700° F., a pressure of 500 pounds per square inch gauge, a liquid-hourly space velocity of 9 volumes of hydrocarbon per volume of catalyst per hour and a hydrogen rate corresponding to a mol fraction of hydrocarbon in the reactor charge of 0.75. The reactor effluent is cooled by the condenser 25 or other heat exchange means to condense normally liquid hydrocarbons. The cooled reactor effluent is passed to the liquid-gas separator 26. Hydrogen-rich recycle gas is withdrawn by line 27 and the hydrocarbon condensate is passed by line 28 to the debutanizer or stabilizer column 29. Butane and lighter hydrocarbons are withdrawn overhead by line 30 and pentanes and heavier hydrocarbons are passed to the fresh feed line by line 12.

Drier 24 is a column or vessel filled with a granular solid adsorbent drying agent. A preferred drying agent is the molecular sieve type of adsorbent. As is known in the art, molecular sieves are crystalline, dehydrated zeolites, natural or synthetic, having a well defined physical structure. Synthetic materials of this type have been widely discussed in recent literature. See, for example, U.S. Patents 2,882,243 and 2,882,244. Molecular sieves are hydrous aluminum-silicates generally containing one or more sodium, potassium, strontium, calcium or barium cations, although zeolites containing hydrogen, ammonium or other metal cations are also known. They have a characteristic three-dimensional aluminum-silicate anionic network, the cations neutralizing the anionic charge. Upon dehydration, the three-dimensional lattice network of the crystal is maintained, leaving intercommunicating channels, pores or interstices of molecular dimensions within the crystal lattice. For each zeolite of this type, the narrowest cross sectional diameter of the channels is a characteristic and is substantially uniform and fixed throughout the crystal. Materials are available with channel diameters of substantially all 4 angstrom units, all 5 angstrom units, etc. They are customarily designated as molecular sieves of a particular channel diameter, for example, as molecular sieves having a channel diameter of 5 angstrom units or more simply, 5 angstrom molecular sieves. The 4 angstrom sodium aluminum-silicate molecular sieve marketed by Linde Air Products Company as Linde Type 4A Molecular Sieve is particularly suitable as the adsorbent drying agent for the hydrogen and/or hydrocarbon streams in our process.

The flow diagram of the drawing shows the make-up hydrogen stream as being contacted with the adsorbent drying agent in drier 24. In this modification of the process the other components of the reactor charge are subjected to fractional distillation which removes water that might be present in the stream. The fresh feed is fractionated in column 11 and any water in the fresh feed is withdrawn overhead by line 14. This substantially eliminates water from the system. There is unlikely to be any water in the recycle hydrogen stream of line 27. However, if for any reason recycle stream 27 does contain water, the stream can be charged to drier 24 or to a separate drier of similar type before recycle to the reactor. Furthermore, if water is not eliminated from the fresh feed by fractionation in column 11, the fresh feed can be charged to a drier such as drier 24 to remove water. Still further, if the fresh feed does not require fractionation, for example, if a normal pentane fraction is charged from storage directly to the reactor, the hydrocarbon charge can be contacted with an adsorbent drying agent. Thus, as illustrated in the drawing, if normal pentane is charged from tank 32 as a supplement to the hydrocarbon stream from line 20, or in lieu of the hydrocarbon stream from line 20, the pentane fraction is passed through the drier 33, similar to drier 24, to reduce the water content sufficiently that the reactor charge in line 23′ contains less than 35 parts per million of water.

As we have indicated, even if the isomerization hydrocarbon feed is prefractionated as in the embodiment of our process shown in the drawing, a possible source of water in the reactor charge is the make-up hydrogen stream. This hydrogen will normally come from high pressure storage vessels and we have found that hydrogen stored in the conventional manner will normally be saturated with water which unavoidably is accumulated in storage vessels and transfer lines. The water content of such stored hydrogen can be in the range of about 700 to 2,400 parts by weight of water per million parts of hydrogen at storage temperatures from 32° to 64° F. Hydrogen streams containing such amounts of water can be dried by contact with a column of pelleted Linde Type 4A Molecular Sieves to reduce the water content to well below 15 parts per million.

Although molecular sieve adsorbents are preferred drying agents for the hydrogen or hydrocarbon components of the reactor charge, other adsorbent drying agents can be used. Suitable adsorbents include adsorbent alumina, silica gel, magnesium perchlorate, calcium sulfate and phosphorus pentoxide. It is also possible to use a series of driers containing different adsorbents. For example, a hydrogen gas or hydrocarbon liquid component of the reactor charge can be passed through a first drier vessel containing adsorbent alumina and then through a drier vessel containing 4 angstrom molecular sieves to further reduce the water content.

The following examples describe results obtained in employing the procedure of the present invention in the isomerization of paraffins. The examples also provide a comparison with the results obtained in paraffin isomeration when the hydrocarbon feed is adsorbent-dried but the hydrogen is not dried and the reactor charge contains more than 35 parts per million of water.

EXAMPLE 1

Pure grade n-pentane was hydroisomerized in a series of runs at different reaction conditions over a fixed-bed, pelleted platinum-alumina catalyst. The catalyst was a highly active, fluorine-promoted, platinum-alumina isomerization catalyst. It contained 0.57 weight percent platinum, 0.02 weight percent chlorine, 2.5 weight percent fluorine and the rest essentially alumina. In runs 1–3, both the pentane and the hydrogen were dried by contact with a column of 4 angstrom molecular sieve pellets at a temperature about 75° F. In these runs the reactor charge, including the hydrocarbon and the hydrogen, contained about 5 to 10 parts by weight of water per million parts of hydrocarbon. In runs 4–6 the pentane was dried but the hydrogen was "wet," i.e., was not dried. In these runs the hydrocarbon charge contained more than 35 parts by weight of water per million parts of hydrocarbon. Reaction conditions common to each run included reactor pressure of 500 pounds per square inch gauge and hydrogen feed rate of 500 standard cubic feet per barrel of hydrocarbon (corresponding to a mol fraction of hydrocarbon in the reactor charge of 0.70 to 0.71). Table I below lists for each run the other reaction conditions and the approximate water content of the reactor charge. The table also lists the results of each run in terms of the product composition as determined by gas chromatographic analyses. Liquid product yields are not given in the table but were in the range of about 97 to 99 weight percent for each run.

*Table I*

| Run No | 1 | 2 | 3 | 4 | 5 | 6 |
|---|---|---|---|---|---|---|
| Drying procedure | Hydrogen and pentane dried with molecular sieves | | | Only pentane feed dried; hydrogen is "wet" | | |
| Water in reactor charge, p.p.m. | About 5 to 10 | | | Greater than 35 | | |
| Reaction conditions: | | | | | | |
| Temperature, °F | 852 | 822 | 821 | 851 | 820 | 820 |
| Space velocity, vol./hr./vol. | 37.8 | 25.2 | 12.6 | 37.8 | 25.2 | 12.6 |
| Product composition, Mol Percent: | | | | | | |
| $C_1$–$C_4$ | 1.2 | 0.5 | 1.3 | 0.5 | (¹) | (¹) |
| Isopentane | 43.0 | 34.2 | 45.3 | 23.1 | 19.5 | 30.8 |
| n-Pentane | 55.8 | 65.3 | 53.4 | 76.4 | 80.5 | 69.2 |

¹ Gas product not collected.

EXAMPLE 2

The charge stock was a technical grade n-hexane fraction. Its approximate composition was 95.8 weight percent n-hexane, 3.3 weight percent methylcyclopentane, and 0.9 weight percent 3-methylpentane. This stock was hydroisomerized over a fixed-bed, platinum-alumina catalyst in two runs employing similar reaction conditions. One of the runs (run 7) employed our procedure of adsorbent drying components of the charge to reduce the water content of the reactor charge to less than 35 parts per million. Specifically, the hydrogen and the hexane fraction were dried by molecular sieve contacting and the resulting reactor charge contained about 5 to 10 parts of water per million parts of hydrocarbon. In the other run (run 8) only the hexane fraction was dried. The hydrogen was "wet" and the reactor charge contained more than 35 parts of water per million parts of hydrocarbon. The platinum-alumina catalyst contained 0.57 weight percent platinum, 0.38 weight percent chlorine and the rest essentially alumina. The hydroisomerization conditions common to each run included reactor pressure of 500 pounds per square inch gauge and hydrogen feed rate of 450 standard cubic feet per barrel of hydrocarbon (corresponding to a mol fraction hydrocarbon in the charge of about 0.7). The other reaction conditions, which were approximately the same in each run, and the results are given in Table II below.

*Table II*

| Run No | 7 | 8 |
|---|---|---|
| Drying procedure | Hydrogen and hexane dried with molecular sieves | Only hexane feed dried; hydrogen is "wet" |
| Water in reactor charge, p.p.m. | About 5 to 10 | Greater tha 35 |
| Reaction conditions: | | |
| Temperature, °F | 832 | 830 |
| Space velocity, vol./hr./vol | 9.5 | 9.4 |
| Liquid product, wt. percent of charge | 95.3 | 97.8 |
| Product composition, mol percent: | | |
| $C_1$–$C_4$ | 4.0 | 6.5 |
| Isohexane | 49.0 | 40.1 |
| n-Hexane | 45.4 | 55.8 |
| Heavier | 0.6 | 0.8 |

Tables I and II show the advantages of our drying procedure in the hydroisomerization of two different paraffins, namely, pentane and hexane. A marked superiority in yield of the desired branched chain products was obtained in the runs in which both the hydrogen and hydrocarbon components of the reactor charge were dried and the reactor charge contained less than 15 parts by weight of water per million parts of hydrocarbon. Table I shows that the superiority of the procedure of the invention was demonstrated at different temperatures and space velocities for hydroisomerization of pentane.

Obviously many modifications and variations of the invention as hereinbefore set forth may be made without departing from the spirit and scope thereof and therefore only such limitations should be imposed as are indicated in the appended claims.

We claim:

1. The hydroisomerization process which comprises contacting at least one component of a hydroisomerization reactor charge comprising hydrogen and an aliphatic paraffin of the $C_4$–$C_7$ range with a solid adsorbent drying agent to reduce the water content of the reactor charge to less than 35 parts by weight of water per million parts of hydrocarbon, and thereafter contacting the reactor charge having said reduced water content with a halogen-promoted, supported platinum-type hydroisomerization catalyst under hydroisomerization conditions of temperature and pressure including a temperature below 850° F.

2. The hydroisomerization process which comprises contacting at least one component of a hydroisomerization reactor charge, composed of a gas containing at least 80 volume percent hydrogen and a paraffinic hydrocarbon fraction of which at least 90 volume percent consists of at least one aliphatic paraffin of no more than 7 carbon atoms per molecule, with a solid adsorbent drying agent to reduce the water content of the reactor charge to less than 35 parts by weight of water per million parts of hydrocarbon, and thereafter contacting the reactor charge having said reduced water content with a fluorine-promoted, supported platinum-type hydroisomerization catalyst under hydroisomerization conditions including a temperature below 850° F., a liquid-hourly space velocity of at least 5 volumes of hydrocarbon per volume of catalyst per hour and a hydrogen rate corresponding to a mol fraction of hydrocarbon in the reactor charge of at least 0.5.

3. The hydroisomerization process which comprises contacting at least one component of a hydroisomerization reactor charge, composed of a gas containing at least 80 volume percent hydrogen and a paraffinic hydrocarbon fraction of which at least 90 volume percent consists of at least one aliphatic paraffin of no more than 7 carbon atoms per molecule, with a molecular sieve solid adsorbent drying agent to reduce the water content of the reactor charge to less than 15 parts by weight of water per million parts of hydrocarbon, and thereafter contacting the reactor charge having said reduced water content with a fluorine-promoted, supported platinum-type hydroisomerization catalyst under hydroisomerization conditions of temperature and pressure, including a temperature below 850° F.

4. The hydroisomerization process which comprises contacting at least one component of a pentane hydroisomerization reactor charge, composed of a gas containing at least 80 volume percent hydrogen and a hydrocarbon fraction of which at least 85 volume percent consists of n-pentane and the rest essentially other open-chain paraffins, with 4 angstrom molecular sieve solid adsorbent drying agent to reduce the water content of the reactor charge to less than 15 parts by weight of water per million parts of hydrocarbon, and thereafter contacting the reactor charge having said reduced water content with a fluorine-promoted, platinum-alumina hydroisomerization catalyst containing 0.2 to 1.0 weight percent platinum and 1 to 4 weight percent fluorine, under hydroisomerization conditions including a temperature of 600° to 850° F., a pressure of 200 to 600 pounds per square inch gauge, a liquid-hourly space velocity of at least 5 volumes of hydrocarbon per volume of catalyst per hour and a hydrogen rate corresponding to a mol fraction of hydrocarbon in the reactor charge of at least 0.5.

5. The hydroisomerization process which comprises contacting at least one component of a hexane hydroisomerization reactor charge, composed of a gas containing at least 80 volume percent hydrogen and a hydrocarbon fraction comprising at least 85 volume percent aliphatic hexanes with 4 angstrom molecular sieve solid adsorbent drying agent to reduce the water content of the reactor charge to less than 15 parts by weight of water per million parts of hydrocarbon, and thereafter contacting the reactor charge having said reduced water content with a fluorine-promoted, platinum-alumina hydroisomerization catalyst containing 0.2 to 1.0 weight percent platinum and 1 to 4 weight percent fluorine, under hydroisomerization conditions including a temperature of 600° to 850° F., a pressure of 200 to 600 pounds per square inch gauge, a liquid-hourly space velocity of at least 5 volumes of hydrocarbon per volume of catalyst per hour and a hydrogen rate corresponding to a mol fraction of hydrocarbon in the reactor charge of at least 0.5.

References Cited in the file of this patent

UNITED STATES PATENTS

| | | |
|---|---|---|
| 2,642,383 | Berger et al. | June 19, 1953 |
| 2,759,876 | Teter et al. | Aug. 21, 1956 |
| 2,792,337 | Engel | May 14, 1957 |
| 2,831,908 | Starnes et al. | Apr. 22, 1958 |
| 2,856,347 | Seelig et al. | Oct. 14, 1958 |
| 2,905,736 | Belden | Sept. 22, 1959 |
| 2,910,139 | Matyear | Oct. 27, 1959 |
| 2,924,629 | Donaldson | Feb. 9, 1960 |

OTHER REFERENCES

Linde Company, Petroleum Refiner, vol. 36, No. 7, pages 136–140, July 1957.